United States Patent [19]

Studer et al.

[11] Patent Number: 4,977,310
[45] Date of Patent: Dec. 11, 1990

[54] PROGRAMMABLE CONTROL OR REGULATING DEVICE

[75] Inventors: Werner Studer, Oberägeri; Stefan Hagmann, Meierskappel; Marcel Strotz, Baar, all of Switzerland

[73] Assignee: LGZ Landis & Gyr Zug, Zug, Switzerland

[21] Appl. No.: 305,410

[22] Filed: Feb. 1, 1989

[30] Foreign Application Priority Data

Feb. 2, 1988 [CH] Switzerland ............... 347/88

[51] Int. Cl.$^5$ ............................................. G06F 15/20
[52] U.S. Cl. ..................................... 235/375; 235/487; 235/454; 364/146
[58] Field of Search ............... 364/146; 235/454, 487, 235/375

[56] References Cited

U.S. PATENT DOCUMENTS 4,460,844  7/1984  Kadogaki .................. 235/375
4,682,014  7/1987  Iwama ....................... 235/375

OTHER PUBLICATIONS

"Monogyr Dialog", Mar. 1987.

Primary Examiner—Harold I. Pitts
Attorney, Agent, or Firm—Marmorek, Guttman & Rubenstein

[57] ABSTRACT

A programmable regulating device, preferably for the regulation of a heating, ventilation and/or air conditioning installation, is disclosed. The inventive device illustratively comprises a microprocessor, a program and data memory and a service panel which includes a label, selection keys, edit key and display. The contents of the label are variable. A plurality of service cards are assigned to the service panel. Each service card is provided with a number of display lines equal to the number of lines in the label and supports a machine-readable encoding field comprising one or more markings. The service panel is provided with a reading unit by means of which all existing markings can be read. The encoding field of each service card is differentiated by the number and/or varying arrangement of markings, so that the microprocessor is informed through the reading unit and the encoding field as to which service card has been assigned to the reading unit. Depending upon the information recognized, the microprocessor services a program part attributed to that information and displays on each display line the information pertaining to the corresponding line in the label.

12 Claims, 5 Drawing Sheets

PROGRAMMABLE CONTROL OR REGULATING DEVICE

FIELD OF THE INVENTION

The instant invention relates to a programmable control or regulating device.

BACKGROUND OF THE INVENTION

Regulating devices of this type are known for example through the product description "Monogyr Dialog" of the Landis & Gyr Co., Zug (Switzerland). Such devices are able to solve various control and regulating problems in that a microprocessor runs a program which carries out these control functions and regulating tasks. The program is stored in a program memory and uses data stored in a data memory. The program memory is as a rule a read-only memory (ROM). Different program flows are made possible by the fact that different programm parts are serviced on basis of definite data. The data which influence the program flow are as a rule entered on the one hand via a control panel and are called up by peripherals on the other hand.

If such a regulating device is to be used universally, its user must be able to program it. The more varied the possibilities of the regulating device, the more complicated are in general the actions to be undertaken by the user. In a regulating device used to regulate heating, ventilation and air conditioning plants a number of different parameters and factors are to be entered by the user into the regulating device. To cite some examples: The information as to what room temperature for which given time period is to be controlled by the regulating device must be entered in said regulating device; a program selection must be made for the regulating device to enable it to carry out certain different control tasks in view of the differences in the plant to be controlled.

In known regulating devices the applicable operating method is usually different for each device and can be understood by the user only with difficulty, so that the regulating device must generally be accompanied by voluminous and extensively illustrated operating manuals. If the user wishes to act upon the regulating device he must refer to this operating manual to obtain information on the operations method for whatever option of the regulating device is desired at the time. In many cases the operating methods are actually so difficult to understand that the user must call on a specialist who is then responsible for adjusting the regulating device in accordance with the user's wishes.

It is the object of the instant invention to create a control or regulating device which makes it possible to render the dialog between operator and control or regulating device easy to understand and to grasp by using the simplest possible resources.

SUMMARY OF THE INVENTION

The present invention is a programmable regulating device which is easy for an operator to use. The regulating device is preferably used for heating, ventilating and air conditioning installations.

The regulating device comprises a microprocessor, a program and a data memory, and a service panel. The service panel comprises a label, a plurality of selection keys, an edit key, and a display. The contents of the labels are variable.

To this end, a plurality of service cards are associated with the service panel. Each service card is provided with a number of label lines corresponding to lines in the service panel display and includes a machine readable encoding field formed from one or more markings. The service panel is provided with a reading unit for reading the markings. The encoding field of each service card is differentiated by the number and/or arrangement of the markings, so that the microprocessor is informed through the reading unit as to which service card is being utilized. Depending upon the particular service card, the microprocessor services an appropriate program portion and the display displays information appropriate to the service card. Thus, for different service cards, different information is displayed. The displayed information may be altered using the selection and edit keys of the service panel.

DETAILED DESCRIPTION OF THE INVENTION

Figure 1:
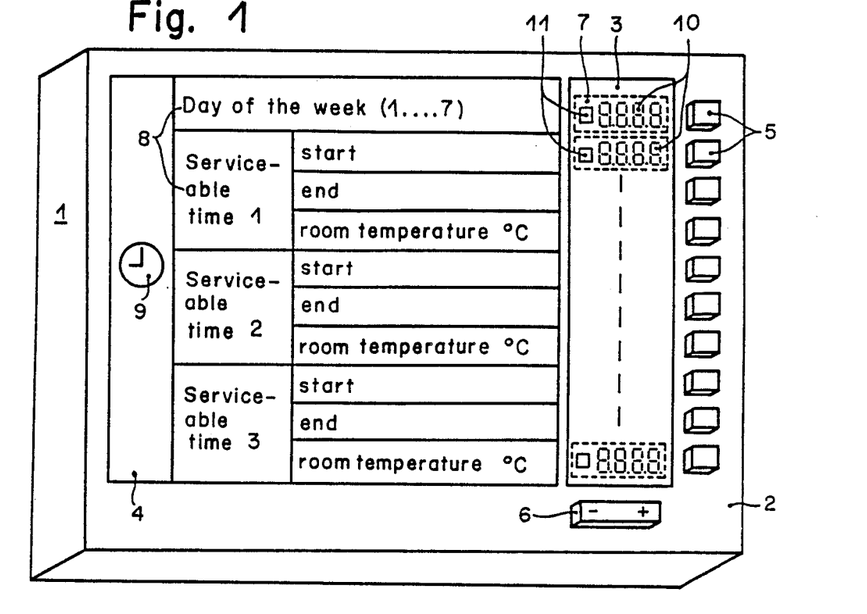
FIG. 1 shows a regulating device with its service panel.

A regulating device shown in FIG. 1 is equipped with a service panel 2 through which the user can communicate with the regulating device 1. A display 3, e.g. in form of a liquid crystal display, a label 4, a plurality of selection keys 5 and one edit key 6 is laid out on the service panel 2. Within the display 3 are a number of display lines 7. The number of selection keys 5 is here equal to the number of display lines 7, with each display line 7 being assigned one of the selection keys 5. The label 4 contains information in form of texts 8 and/or symbols 9, of which at least a portion is arranged in form of lines so that the texts 8 and/or symbols 9 can be recognized without further explanation as belonging in meaning to the display lines 7 and to the selection keys 5. It is for example clearly seen that the symbol 9, in form of a clock, is associated to all the display lines 7 and to all the selection keys 5 while the text "day of the week (1 .... 7)" is associated only with the uppermost display line 7 and to the uppermost selection key 5. It is also clear, without any further explanation, that the text "serviceable time 1" is associated to the second, third and fourth lines from the top. It is thus possible to recognize without any doubt that the text "Serviceable Time 1, Start" belongs to the second display line 7 from the top and to its associated selection key 5. Through the texts 8 and symbols 9 within the label 4 the meaning of every display line 7 within the display 3 and the meaning of every selection key is thus made clear to the user.

Each selection key 5 serves to select a display line 7 which is activated by depressing a key 5 from among all the display lines 7 and the texts 8 and/or symbols 9 associated with said display lines 7. Each display line 7 of the display 3 furthermore contains, in addition to a certain number of digits 10, also a marker field 11.

The marker field 11 can be a geometric figure of any shape which is only visible when it has been activated. This marker field 11 can serve different purposes. It can be used, for example, to indicate to the user which selection key he has depressed last. If a selection key is depressed briefly, a display appears in the marker field 11. The marker field 11 is invisible in all the inactive display lines 7. This type of optically recognizable marking has the advantage of letting the user know without any doubt which selection key 5 has been depressed by one of his operating actions. It is therefore not necessary for the user to remember each time which selection key 5 he has depressed last.

The number of digits 10 of each display line 7 is determined by the values to be displayed and by the precision with which they should be displayed. If for example displays of the numbers of week days, for clock times, to indicate temperatures, of relative air humidity values and for programs are required, such as is the case as a rule for regulating devices for heating, ventilation and air-conditioning plants, four digits are generally sufficient, with the possibility of assigning a decimal point to each digit for the display of numerical values and/or a colon when times are to be displayed. Each display line 7 thus comprises four digits 10 and one marker field 11, for example.

While the selection keys 5 serve to select a display line 7 and the associated text and/or symbol line, it is the role of the edit key 6 in correcting the displayed values called up by the activated selection key 5. Because it is necessary as a rule to change values in positive and in negative direction, i.e. to increment or decrement the values, it is appropriate to use a edit key 6 in form of a toggle key.

Such a toggle key emits different signals depending which end of the key is depressed. If the end marked with a "+" sign is depressed, an incrementing action is initiated in a known manner, while depressing the toggle key end marked with a "−" sign initiates a decrementing action. The user can recognize without detailed explanation and beyond any doubt what is meant in each case and what consequence his action will provoke when he depresses on of the key ends.

Of course it is also possible to use two separate keys instead of a single toggle key, whereby one of these keys assumes the incrementing function of the toggle key and the other the decrementing function of the tilting key.

In a regulating device 1 with a service panel 2 as shown in FIG. 1 and with ten selection keys 5, ten values can be displayed and modified. These could be, according to the shown text 8 and symbols 9 in the figure, the day of the week with values from one to seven and three serviceable times, whereby start and finish for each serviceable time and the room temperature to be maintained during that serviceable time can be entered. By entering these data the user can program the regulating device 1. Instead of ten selection keys 5 and one display 3 with ten display lines 7, it would also be possible to have eight or ten of the latter. The number is in principle optional.

An efficient regulating device should however offer additional service possibilities. The thought of increasing the number of selection keys 5 and of display lines 7 in accordance to desired programming and display possibilities comes first to mind, however this is limited by the size of the service panel 2. Furthermore costs would increase with an increase of service elements and display possibilities. In addition clarity would suffer to a great extent if a great number of service elements and display possibilities are used. Twelve selection keys 5 and twelve display lines 7 can be considered as optimal for ergonomic reasons.

However, because the twelve operations which are thus possible with an efficient regulating device are not enough, it is provided for the label 4 of the regulating device described herein to be replaceable and for the selection keys 5 and the display lines 7 to be assigned different functions, depending upon the label 4 used, whereby the regulating device 1 is able to recognize the nature of the label automatically.

Figure 2:
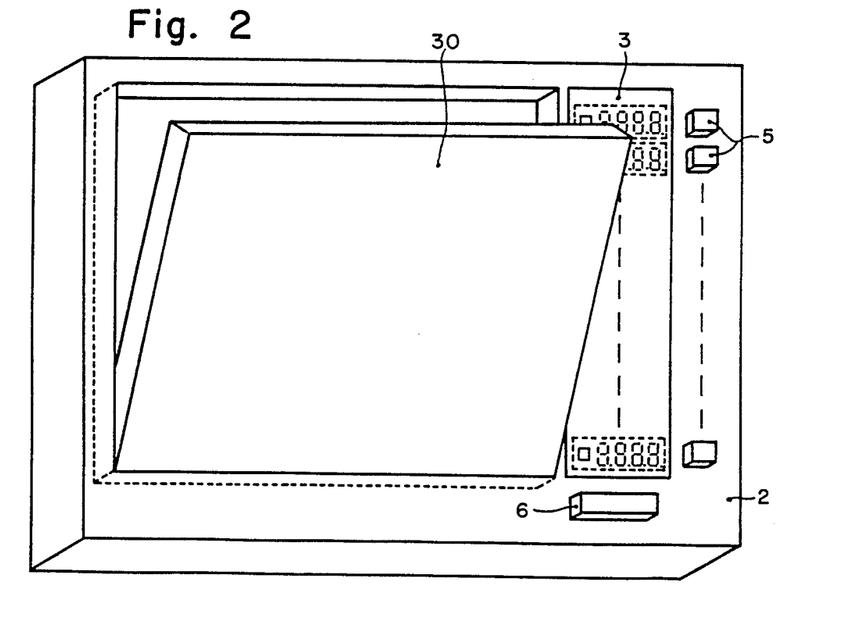
FIG. 2 shows a regulating device with a variable service panel.
Figure 3:
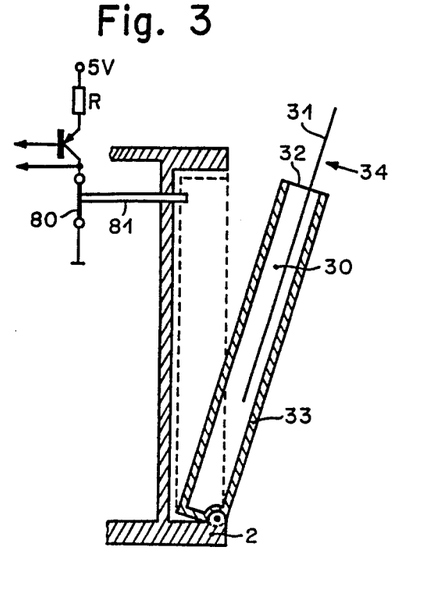
FIG. 3 shows a section through a cassette of the variable service panel.

In order to render this variability of the label 4 more user-friendly, a regulating device 1 according to FIGS. 2 and 3 is provided with a cassette 30 instead of a simple label 4, said cassette being installed on the service panel 2 of the regulating device 1 in such manner as to be capable of being swivelled. The cassette 30 is shown in its open position in FIG. 3, while the "closed" position is indicated by a broken line.

The service cards 31 (see FIG. 4) can be introduced into this cassette 30 through an opening 32 when said cassette 30 is in its open position. If the cassette 30 assumes its "closed" position however, it is not possible to insert service cards 31 and a service card 31 which has already been inserted cannot be removed. The cassette 30 has a transparent face 33 through which the face of the service card 31 is visible even when the cassette 30 is closed. Texts 8 and symbols nine printed on this face 34 are thus as visible also to the user as the label 4 on the monitor face 2 in a regulating device according to FIG. 1. The face 34 thus assumes the function of the label 4, i.e. it becomes itself a label 4.

It advantageous to combine several such service cards 31 into a block 36 (FIG. 4), by means of a spiral 35 for example. Instead of a single service card 31 the entire block 36 of service cards 31 is pushed into the opening 32 of the cassette 30, whereby the uppermost service card 31, as seen by the operator, the face 34 of which is turned towards the user, is the active service card 31.

Figure 4:
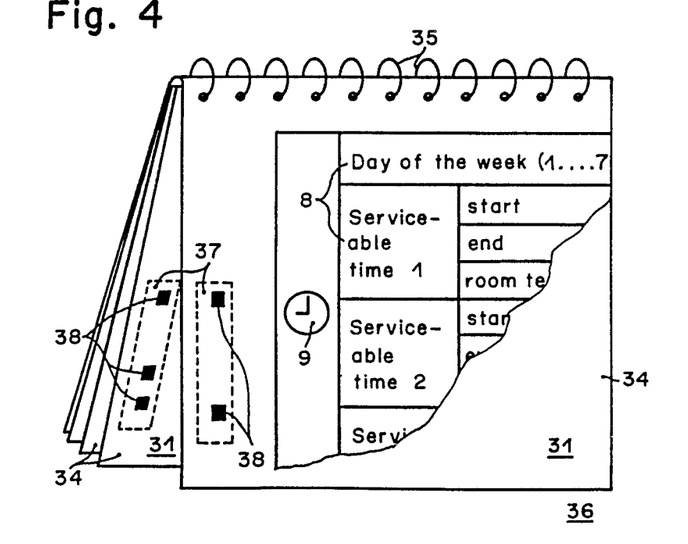
FIG. 4 shows a block comprising several service cards.

Every service card 31 within the block 36 contains different information with respect to the representation of texts 8 and symbols 9 on each face 34. The service cards 3 are imprinted with a machine-readable code which is unique because the regulating device 1 must make different data available in the different display lines 7 of display 3, depending on the face 34 of every service card 31, and the regulating device 1 is provided with a device for the detection of these codes.

Each service card 31 has an encoding field 37 on its face 34 in which different markings 38 are contained. There are many different possibilities for such an encoding. The type of device used for machine-reading of such codes must take into account the manner in which the codes are structured. Different possibilities for such combinations of reading devices/codes are described below.

A simple, static-operated code reading system is comprised in that each service card 31 is imprinted on its face 34 with one of the information units at one of a number of precisely defined locations corresponding to the position of optical scanning elements. Such different information units which can be detected by the scanning elements could be the information "light" on the one hand and "dark" on the other hand, or "white" and "black".

Figure 5:
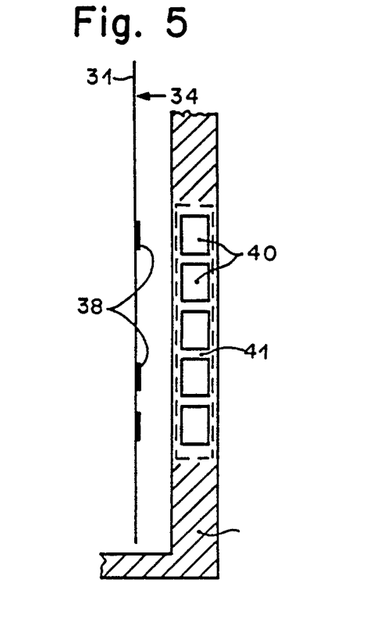
FIG. 5 shows a device for the static acquisition of machine-readable optical codes.

For this purpose a reading unit 41 comprising several read elements 40 can for example be present in the cassette 30 (FIG. 5). Each read element 40 is comprised, here, here, for example, of a light-emitting diode and of a photo transistor. The light-emitting diodes of each read element 40 are constantly under a voltage, at least during the machine-reading process, and therefore constantly emit light. If a white surface is in front of a read element 40, the emitted light is reflected and reaches the optics of the photo transistor of the read element 40. This causes the photo transistor to become conductive. If however a black surface is in front of a read element 40, the emitted light is not reflected. No light reaches the optics of the photo transistor so that it does not become conductive. In this manner electrical signals can be obtained through the nature of a surface in front of the read element 40. A white surface means that an electrical signal corresponding to a logic "0" is produced, and a black surface means that a signal corresponding to a logic "1" is produced.

When five read elements 40 are used, $2^5=32$ codes can be represented, since two states are possible in each case. The state in which all the surfaces in front of the read elements 40 are white could be suitably used to indicate that no service card 31 is inserted into the cassette 30. This is achieved in that the surface of the cassette 30 which is in front of the reading unit 41 is white.

In this way thirty-one different service cards 31 can be distinguished from each other if each service card 31 is provided with an unchangeable code with at least one black marking 38. This is entirely sufficient for the needs of a regulating device of this type.

A regulating device of this type is comprised (FIG. 6) of a microprocessor (50) which is connected to a programm memory 51 and a data memory 52. The program memory 51 and the data memory 52 can also be one single memory 53 in which the programs and the data are stored. If separate memories are present for the program and for the data, i.e. a program memory 51 and a data memory 52 are used, it is indicated to use a Read Only Memory (ROM) as the program memory 51 and a Random Access Memory (RAM) as the data memory 52, while an Electronically Erasable Programmable Memory (EEPROM), in which the data can be kept permanently but in which data can also be overwritten, is to be used in case that one single memory 53 is used to store the program and the data.

Figure 6:
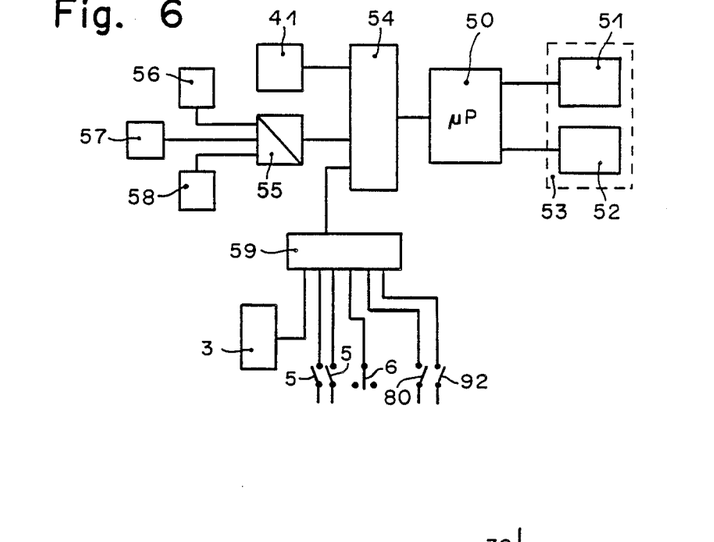
FIG. 6 shows a block diagram of a regulating device.

The microprocessor 50 is furthermore connected to an interface 54 to which the peripherals are connected. Such peripherals are for instance the reading unit 41, but also an analog/digital converter 55 for instance, via which the temperature sensor such as an advance temperature sensor 56, a room temperature sensor 57 and/or an exterior temperature sensor 58 can be connected, for example. The display 3 as well as the selection keys 5 and the edit key 6 are connected to the interface 54, but preferably not directly but via a multiplexer 59. It is then however also possible to connect the selection keys 5 and the edit key 6 directly to the microprocessor 50, for example. The levels of the individual read elements 40 (FIG. 5) of the reading unit 41 (FIG. 5) are adjacent to the interface 54 and are therefore recognizable to the microprocessor 50. A program stored in the program memory 51 or in the memory 53 and determining the operation of the microprocessor 50 can be made so that the levels of each individual read element 40 can be scanned periodically.

The program which runs in the microprocessor 50 branches in a manner dependent on the logic levels detected by the read elements 40. This makes it possible to branch off in function of the code of a given service card 31 into a program part which transmits precisely those data to the display 3 which belong to the contents of the text field 4 with texts 8 and symbols 9 of this particular service card 31.

If for instance on a service card 31 with the code "01101" the text "Day of the Week (1 . . . 7)", is assigned to the first display line 7, the text "Serviceable Time 1 Start" to the second display line 7, the text "Serviceable Time 1 End" to the third display line 7 and the text "Room Temperature °C" to the fourth display line 7, the microprocessor 50, as soon as it recognizes via the interface 54 that the code "01101" is read on the reading unit, branches off to the program part which displays a number for the day of the week in the first display line of the display 3 in accordance with the state of an internal clock integrated into the program, the value of the start of the first serviceable time period attributed to that day in the second display line 7, such as it is stored in the memory 52, etc.

As a function of the code of a service card 31, a definite program part assigned to that code is thus serviced in the microprocessor 50. A corresponding program part exists in the program for each realized code of a service card 31.

The encoding described up to now is described a being static because the code of a service card 31 remains available statically at the interface 54 for as long as the service card 31 concerned remains in the cassette 30.

Figure 7:
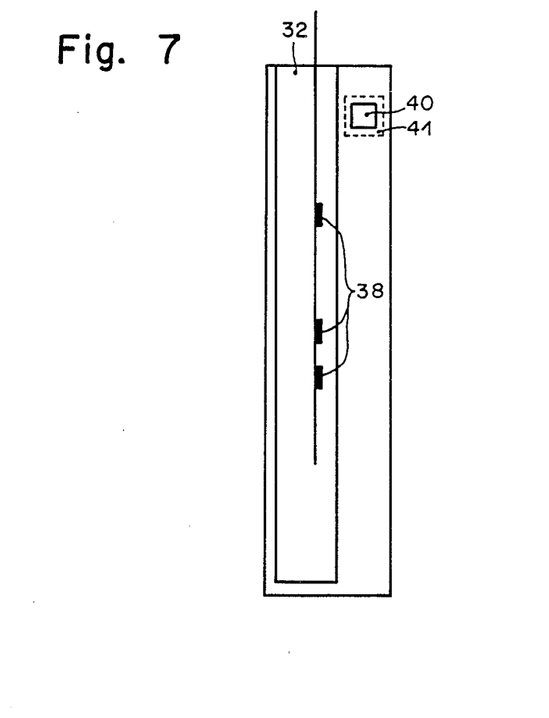
FIG. 7 shows a device for the dynamic acquisition of machine-readable optical codes.

It is however also possible to use dynamic encoding which is read only during the insertion of the service card 31 into the cassette 30 and is then stored in the data memory 52. This is advantageous because the expense for the reading unit 41 can be reduced (FIG. 7). It is possible to read an encoding field 37 by means of a read element 40 containing one single reading unit 41.

While it is necessary with static encoding for the locations of the markings 38 to be precisely registered with the locations of the read elements 40, care must be taken with dynamic encoding for the encoding field 37 with markings 38 to register on the one hand with the location of the single read element 40 and on the other hand for the longitudinal axis of the encoding field 37 to be placed precisely in the direction of movement of the service card 31 during insertion into the cassette 30, so that the markings 38 are moved past the read element 40 as a service card 31 is inserted. The markings 38 are therefore placed in a coded track.

In order to render the result of the code evaluation independent of the speed at which the service card 31 is inserted and also to create the possibility of easily recognizing an incomplete insertion of the service card 31, a static coding is not sufficient. Two variants of an encoding suitable for dynamic reading are explained in greater detail below.

It is a known and general practice and has also been described above in the context of static encoding, to attribute for example an electric signal corresponding to the logic "0" to a white surface and an electric signal corresponding to the logic "1" to a black surface. In order to achieve a high degree reading reliability it is however proposed herein not to use the brightness signal per se but its derivative in time in accordance with the change in brightness to obtain the logic information.

To this end two encoding fields 37 (FIG. 8), i.e. a first encoding field 37' and a second encoding field 37" are advantageously located next to each other so that their longitudinal axes are parallel. Assigned to these is a reading unit 41 with a first read element 40' and a second read element 40", Whereby the first read element 40' is attributed to the first encoding field 37' and the second read element 40" to the second encoding field 37". The encoding fields 37' and 37" are placed on the face 34 of a service card 31. As the service card 31 is moved through the reading unit 41 in the direction indicated by arrow 42, the signals s' and s" are produced as a function of the time t, corresponding to the derivative in time of the brightness signal at the read elements 40' and 40". The signals resulting from the obtaining the derivatives s' of the brightness encoding field 37' correspond to logic "zero". The signals resulting from the obtaining of the derivative s" of the brightness of the encoding field 37" correspond to logic "one". The addition of the time derivatives s' and s" results in the signal sequence F.

Figure 9:
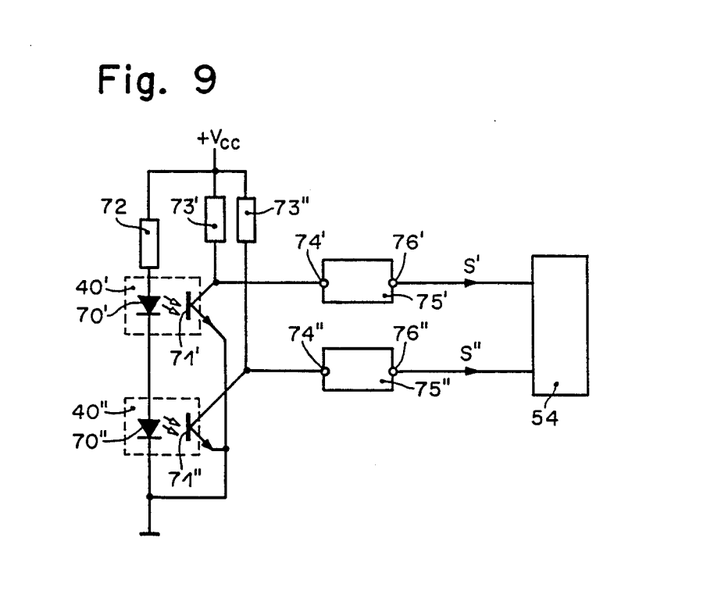
FIG. 9 shows a circuit for the conversion of optical codes into electric signals.

To obtain a conversion of this type of the encoding field into electric signals, the circuitry shown in FIG. 9 can be used, for example. It contains two read elements 40' and 40", each comprising a light emitting diode 70' or 70" and of a photo transistor 71' or 71". It is indicated to connect the two light emitting diodes 70' and 70" in series together with a preresistance 72, whereby the pre-resistance 72 is for example connected to the positive operating voltage $V_{cc}$, while the cathode connection of the light emitting diode 70" is grounded.

The photo transistors 71' and 71" are wired so as to be grounded with their emitter connections, while their collector connections are connected to the resistances 73' or 73". The second connection of the resistance 73', 73" is connected to the operating voltage +Vcc. The collector connections of the photo transistors 71' and 71" are furthermore connected to the inputs 74' or 74" of a signal processing circuit 75' or 75". In addition, each of the signal processing circuits 75' or 75" is provided with an output 76' or 76". These outputs at which the signal sequences s' or s" occur (FIG. 8) are connected to the interface 54.

If a black marking 38 is located in front of the optics of the read element 40' comprising the light emitting diode 70' and the photo transistor 71' the photo transistor 71' is nonconductive. Therefore its collector connection and with it also input 74' of the signal processing circuit 75' is at the potential of the operating voltage (high potential). If however a white surface is in front of the optics of the read element 40' the photo transistor 71' is conductive and therefore its collector connection and with it also the input 74' of the signal processing circuit 75' is at approximately ground potential (low potential). The signal processing circuit 75' in turn produces an impulse which it transmits via its output 76' to the interface 54 at each change-over from high to low potential and from low to high potential.

The second part of the diagram shown in FIG. 9, comprising a read element 40" which is constituted by the light emitting diode 70" and the photo transistor 71", by the resistance 73" and the signal processing circuit 75" with its input 74" and its output 76" functions in an analogous manner.

It is not absolutely required to carry out the conversion of the information placed in the encoding fields 37 into a serial logic signal by means of signal processing circuits 75' and 75". The integrated circuits which can be produced thanks to the newer technologies present considerably easier solutions.

The described encoding method functions reliably also if the speed at which a service card 31 is inserted into the cassette 30 is not uniform because it is possible to easily obtain the elementary signal from the serial signal connection by means of an EXOR function. A clock signal brought in from the outside is therefore not required and is therefore not necessary to maintain a constant speed for the insertion.

While the number of required read elements 40 for static code plotting depends on the number of service cards to be distinguished, only one read element 40 per encoding field is required for dynamic code plotting, whatever the number of the service cards 31 to be distinguished from each other. Without any additional expense for the reading device it is thus possible to considerably increase the number of the different codes through dynamic code evaluation. Thus the encoding fields 37' and 37" shown in FIG. 8 make it possible to obtain 21 bits of information. Since the total number of $2^{21} = 2,097,152$ service cards 31 which can be distinguished from each other in this manner is not at all required, it is possible to use the number of bits above and beyond the number required for the distinction between different service cards 3 for other purposes, e.g. to build up a field-redundant code.

The space requirements for the encoding field 37 (FIG. 4) is determined by the number of desired bits and by the dimensions of the reading unit. It is possible to make the reading unit 41 so small that the width of an encoding field 37 can be reduced to approximately 2 mm and so that the distance between the encoding fields 37' and 37" (FIG. 8) may be sized at only approximately 2 mm. The minimum length of a marking 38, in relation to the direction of movement during reading, can also be reduced to approximately 2 mm. It is thus possible, for example, to place approximately 25 bits in information on a 50 mm-length of an encoding field 37.

It is also possible to provide a definite pattern of markings 38, identical for all the service cards 31 at the beginning of the encoding field 37 so that it is possible in this way to check first of all, each time a service card 31 is inserted into the cassette 30, whether the reading device works perfectly. It is also possible to render the end of the encoding field 37 recognizable by means of a definite uniform pattern of markings 38, identical for all the service cards 31. In this way it is possible for the regulating device 1 to recognize automatically whether a service card 31 has been inserted completely into the cassette 30. If the regulating device 1 recognizes by means of the program running in its microprocessor 50 that a service card 31 has not been inserted completely into the cassette 30, the program running in the microprocessor 50 can cause a message such as "Err" (error) to appear in the first display line 7 of the display 3, and this message can be flashing for improved attention-getting while all the other display lines 7 remain empty at the same time and the functions of the selection keys 5 and of the edit key 6 are locked.

It is furthermore advantageous for a marking 38 to be present on at least one of the encoding fields 37 within the range of visibility of the reading unit 41 when the service card 31 is completely inserted. In this way it can be recognized even after a power failure, for example, that a service card 31 is in the cassette 30.

If a service card 31 has been inserted into the cassette 30 and if the information on which service card 31 is in the cassette 30 has been entered into the data memory 52 (FIG. 6), the programm running in the microprocessor 50 can recognize, by referring to this information, which service card 31 is active, and can service the programm portion corresponding to this service card 31 accordingly. The information about which service card 31 is in the cassette 30 is preferably not made available in the data memory 52 but in a data register located in the microprocessor 50. The program then displays the data pertaining to the active service card 31 in display 3.

If the service card were to be removed at that point, the user could no longer interpret the data displayed in display 3 correctly and would therefore become confused. For this reason it is advantageous to wire the regulating device 1 (see FIG. 1) so that it becomes impossible to change the service card 31 while the data pertaining to a particular service card 31 are displayed. This can be achieved advantageously by providing a cassette contact 80 (FIG. 3) near the pivotable cassette 30, capable of being actuated by said cassette 30. The cassette contact 80 is closed when the cassette 30 is in open position and is opened via ram 81 when the position indicated by broken lines is reached as a result of the cassette 30 closing. If the cassette 30 is returned to open position it is closed once more through the action of a spring (not shown) of the cassette contact 80, causing the stopper 81 to be displaced in the direction of the cassette.

When the position of the cassette contact 80 is scanned by the program running in the regulating device 1 in a manner to be described, it is possible restrict the actuation of the device for the reading of the codes of a service card 31 so that said device is actuated only when the cassette 30 is in open position and to activate the device for the display of the display values belonging to a particular service card 31 in display 3 only when the cassette 30 is closed. This ensures that no data belonging to a prompt field 4 may be displayed on display 3 when the cassette 30 is open.

Figure 8:
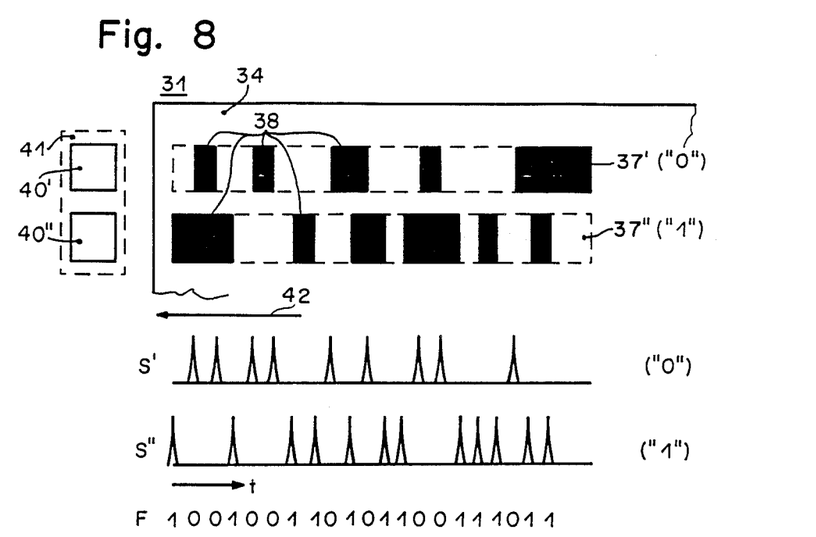
FIG. 8 shows an example of an arrangement of encoding fields of a dynamically readable optical encoding.
Figure 10:
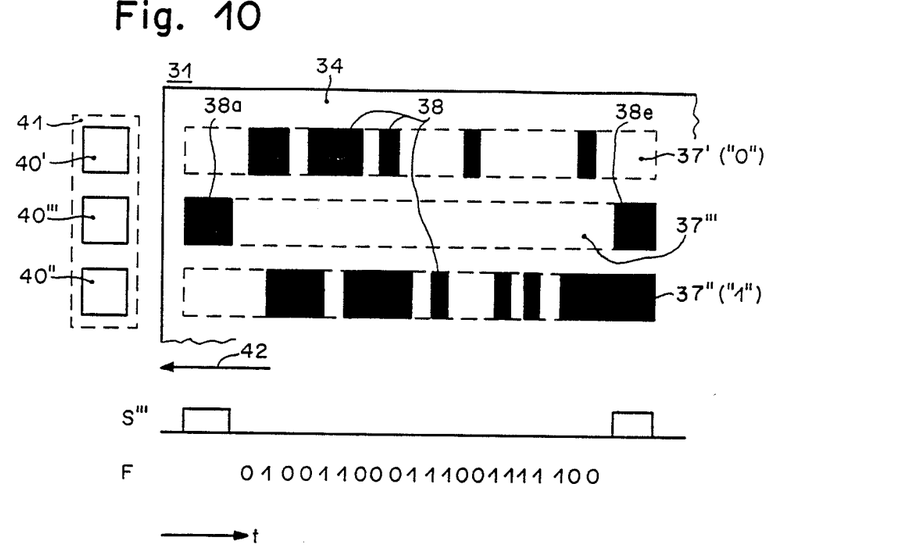
FIG. 10 shows another example of an arrangement of encoding fields.

For codes as shown in FIG. 8 it is necessary to provide a definite arrangement of markings 38 as a function of a definite bit pattern for the recognition of the beginning of an encoding field 37. It is also necessary to provide a definite bit pattern for the recognition of the end of the encoding field 37. It is advantageous however to provide an additional, separate encoding field containing only the information on the beginning and the end, i.e. no information on the data of the service card 31. FIG. 10 shows such an arrangement with three-track encoding.

Since these codes, as compared with those of FIG. 8, contain an additional encoding field 37''', an additional read element 40''' is also provided to read this additional encoding field 37''' so that the reading unit 41 according to FIG. 10 comprises a total of three read elements 40. The additional encoding field 37''' contains only two markings 38, i.e. one at each of the two ends of the encoding field 37'''. One of the markings 38 which is located at the beginning of the encoding field 37''', as seen in the direction of movement during reading, is designated 38a while the marking 38 which is located at the end of the encoding field 37''' as seen in the direction of movement during reading is designated 38e.

The code "start" could be realized by assigning a marking 38 to the encoding field 37''' alone, while no marking 38 is present at the same height, in relation to the direction of movement, in the adjoining encoding fields 27' and 27'', whereby the code "end" could be realized by providing a marking 38 in addition to the marking 38e in encoding field 37''' also in an adjoining encoding field 37, either encoding field 37' or encoding field 37''. In this way it is possible to ascertain when a service card 31 has been inserted only partially into cassette 30 and has then been withdrawn, an action that would result in erroneous and therefore misguiding service card recognition. The third encoding field 37''', which bears only the information concerning "start" and "end" thereby serves to improve reliability with which wrong manipulations can be recognized by the user. The user-friendly nature of the device is thus further improved.

In a programmable regulating device of the type described a difference is to be noted between programming which is done relatively often by the user, and such as is done rarely or possibly only once, at installation. The programming to be done at installation is generally not carried out by the user but by the service personnel of the manufacturer or of his agent. Because such programming requires specialized training concerning the properties of the heating installation, it should not be possible for the user to do such programming.

This subdivision in programmability of functions by the user on the one hand and by the service personnel on the other hand is resolved very easily in a regulating device of the type described above in that the user is given only those service cards 31 which are suitable to programming by the user, while those service cards 31 which require specialized training in connection with programming are made available only to the service personnel. For the user this means that he is not put in a position of having to carry out programming beyond his capabilities.

Figure 11:
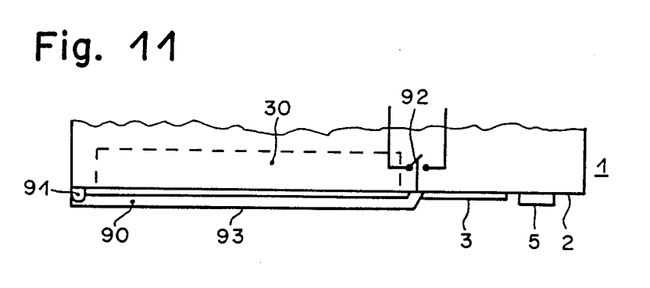
FIG. 11 shows a partial view from above of a regulating device.

It may be of advantage to privilege those service operations which are often carried out by the user, i.e. the entry of switch-on and switch-off times of different heating programs on separate days of the week. The could be implemented for example by providing the regulating device 1 with a locking cover 90 (FIG. 11). The cover could be attached to the control face 2 by means of a hinge 91, for instance. In the closed state of the cover 90 access to the cassette 30 is not possible, so that said cassette 30 cannot be opened. This makes it impossible to exchange service cards 31.

The position of the cover 90 (open or closed) can be verified by means of a cover contact 92. The cover contact 92 would be open, for instance, when the cover 90 is closed, and closed when the cover 90 is open. The position of the cover 90 is recognized by the regulating device 1 on basis of the position of the cover contact 92.

On the cover front 93 facing the user, a label 4 is provided in identical manner as in the regulating device 1 according to FIG. 1. The label 4 of the cover face 93 is made up of texts 8 and symbols 9 as described, and contains information accessible to the user on how the data displayed in display 3 are to be interpreted. If the cover 90 is closed and the cover contact 92 is therefore open, the program running in the microprocessor branches off to that program part which transmits the data belonging to the label 4 of the cover face 93 to the display 3.

The program running in the microprocessor 50 controls a process according to which algorithms permanently entered into the program are scanned and are stored in buffers while taking the characterizing data of the process into account. In a heating, ventilation and/or air conditioning installation, the algorithms describe the interrelations between the process data and the actions to be carried out. Process data in this sense are for example measured exterior temperatures, the temperature of a heating boiler present in the installation, the flow temperature and the backflow temperature in the heating circuit, the temperature of a testing chamber or the temperature of several chambers, the position of a mixing valve between heating boiler circuit and heating circuit, the position of shut-off elements or other valves or air valves and the operating state of a circulation pump. Actions to be carried out in this sense are for example the switching of a heating boiler into in, out or modulating up or down positions, the adjustment of a mixing valve or other shut-off and regulating elements, the adjustment of the rotational speed of circulation pumps.

The programming of the regulating device 1 is a process superimposed upon the controlling process, preferably carried out by interrupt control. However, it is also possible to provide two microprocessors 50, one of which controls the regulating process while the other one controls the programming process.

The program running in the microprocessor 50 polls periodically Whether the user has taken any action. This means that periodic polling takes place to find out whether one of the selection keys 5 or the edit key 6 has been depressed. Furthermore the switching state of the cover contact 92 and of the cassette contact 80 is polled periodically.

If the cover 90 is closed, a program part is called up which displays the data belonging to the label 4 on the cover face 93 in display 3. To clarify the processes that take place in that case it is assumed that the following information is displayed in the label 4 of the cover face 93 in the lines corresponding to the individual display lines 7 of display 3:

| Line | Text | Value in display 3 |
|---|---|---|
| 1 | Clock: Day of the week (1 . . . 7) | 1 |
| 2 | Clock: Serviceable time 1, start | 6.10 |
| 3 | Clock: Serviceable time 1, end | 7.30 |
| 4 | Clock: Serviceable time 1, room temperature °C. | 21.5 |
| 5 | Clock: Serviceable time 2 start | 7.30 |
| 6 | Clock: Serviceable time 2, end | 17.00 |
| 7 | Clock: Serviceable time 2, room temperature °C. | 19.0 |
| 8 | Clock: Serviceable time 3, start | 17.00 |
| 9 | Clock: Serviceable time 3, end | 22.00 |
| 10 | Clock: Serviceable time 3, room temperature °C. | 21.0 |
| 11 | Clock: Copy to day of week No. | 1 |
| 12 | Clock: Room temperature idle time °C. | 15.0 |

The program has taken these programs from the data storage locations provided for the individual values and has copied them to other data storage locations assigned to the different display lines 7 of display 3. The contents of these latter data storage locations are in each instance transmitted via interface 54 and multiplexer 59 to the display 3 and are displayed there in the different display lines 7. In this way the data are displayed in display 3, as shown in the example above.

As long as no selection key 5 has been depressed, the values can be read in the different display lines 7 of display 3, while the marking field 11 of each display line 7 contains no display, i.e. cannot be seen, insofar as the marking field 11 has been used to signal the depression of a selection key 5. If the marking field 11 is used for other purposes, for example to mark interferences such as data outside an admissible range, the depression of a selection key 5 can also be signalled by providing a blinking display of the value appearing in the corresponding display line 7.

The user is in any case informed by the type of display of a display line 7 on whether a selection key 5 had been depressed or not. If no selection key 5 had been depressed, any pressure on the edit key 6 remains without effect. This can be achieved in that the edit key 6 is scanned only when a selection key 5 is active, i.e. has first been depressed, or in that although the edit key 6 is being polled, its state is however ignored by the program.

If the user now depresses the uppermost of the selection keys 5, the value "1" appears and flashes. This is achieved in that the program constantly, e.g. being interrupt-controlled, checks the state of the operating elements (cassette contact 80, cover contact 92, selection keys 5 and edit key 6) which influence the course of the program, and branches off into different program parts in function of the states of these operating elements. If the cover contact 92 is open, meaning that the cover 90 is closed and that the label 4 at the cover face 93 is active, the program branches off to a program part which ignores the state of the cassette contact 92. Subsequent branching-off then takes place in function of the selection key 5 which has been depressed. If for instance the uppermost select switch 5 has been depressed, the branch goes to a program part which displays the uppermost display line 7 of the display 3 in a flashing manner. The state of the edit key 6 is plotted by this program part and a clock the significance of which is to be explained hereinbelow is read.

The value "1" in the uppermost display line 7 of display 3 stands for "Monday", for example, the value "2" for "Tuesday", etc. The user now has the possibility of influencing the value by actuating the edit key 6. It is indicated by "1 . . . 7" in the line of label 4 belonging to this value that values lower than "1" and greater than "7" are not permitted. The program preferably checks automatically that such limit values are respected, such limit values being preferably determined directly in the program, so that no reference to the data memory 52 is necessary. Because of the respect of the limit values the actuation of the edit key at its end marked "—" does not lead to a decrease of the value from "1" to "0". It is appropriate for the value "7" to appear in that case, because the day of the week "7" (Sunday) is the day before the day of the week "1" (Monday). Starting with the value "1", an actuation of the end marked "+" of the edit key 6 changes the value from "1" to "2" and, with renewed actuation, this value is brought from "2" to "3".

If the user has changed the value "1" to "2" for example and wishes to store that value he must depress the uppermost selection key 5 a second time. This carries out the "Enter" function, i.e. the acceptance of value "2" into the appropriate data storage location.

It is advantageous to use the "enter" function also when the user does not again depress the corresponding selection key 5. This can be effected automatically, for example at the end of a defined time period measured by means of the above-mentioned clock, e.g. after 2 minutes, or by actuating any other selection key 5, whereby this actuation of another selection key 5 can result at the same time in activating the corresponding display line 7. It is also appropriate to use the "enter" function by opening the cover 90.

If the user depresses the second selection key 5 from above, the value "6.10" changes from a static state to a flashing state. The user can now increase or decrease this value by using the edit key 6, in the identical manner as explained above. Here too the program-controlled respect of limit values, i.e. "0.00" and "23 59" makes sense and is advantageous.

If the user depresses the fourth selection key 5 from above, the value "21.5" changes from the static into the flashing state. Here too the user can change the value by means of the edit key 6. Without having to open an instruction manual he recognizes immediately that he must enter the value of a room temperature here, to be maintained by the regulating device 1 during the period of time defined by the two points in time shown in the display line above.

In entering such a room temperature it may also be indicated to respect certain limit values. While the limit values for the day of the week and the time on the clock are fixed, inalterable values, it may be practical to use variable limit values when entering temperatures. For a regulating device 1 which is to regulate the heating of a one-family home for example, it may be indicated to us the lower temperature limit value 12° C. and the upper temperature limit value 23° C., while for a regulating device 1 which is to regulate the room temperature in the swimming pool hall of a thermal bath, the lower limit value 20° C. and the upper limit value 35° C. would be appropriate. It is advantageous for that reason for such limit values not to be contained in the program in form of inalterable values, but to be programmable. This programmability is achieved in that the program of the regulating device 1 contains an appropriate subprogram which can be selected by means of a service card 31 contained in the block 36.

The example of the embodiment of the label 4 on the cover face 93 described here comprises three serviceable times, the beginning and end of which can in principle be selected freely. The user can recognize without any further explanation that he is able to program different room temperatures at different times of the day for each and every day of the week, according to his preference.

If the user depresses the selection key 5 assigned to the eleventh line of the label 4, he can again change the value of the day to any value between "1" and "7" by means of the edit key 6. This option offers the possibility of copying to another day a day's program for which the individual serviceable times and their room temperatures have been defined by the user. For example, if the user has programmed the serviceable times and their temperatures for day "2" (Tuesday) and if he wishes that the same serviceable time and temperature data also apply to the days "1" (Monday), "3" (Wednesday) and "4" (Thursday), he is able to carry out this copying process by means of the eleventh selection key 5 and of the edit key 6. In this way he does not have to repeat complete and separate programming for every day.

If the user depresses the lowest selection key 5 the program branches off to a program part which makes it possible to enter the room temperature for a period of time designated as idle time, whereby idle time means the entire time span other than the serviceable times 1 to 3. This time span is also designated as night-time temperature-lowering period, but this is not appropriate in this case because this time span is not necessarily limited to a period of time during the night.

Let it now be assumed that the user is interested in certain parameters of the heating installation, e.g. the prevailing exterior temperature, the actual flow temperature, the heating boiler temperature etc. For this it is necessary for the user to open the cover 90, an action which is preferably possible only by using a key provided for that purpose. From the moment on when the cover 90 is opened the label 4 on the face 93 is no longer active. Since the cover contact 92 closes when the cover 90 is opened, the program now branches off to a different program part. In that program part the state of the cassette contact 80 is checked. If the cassette 30 is open so that it is possible to change service cards 31, a program part is called up which displays in display 3 the number of the individual service card 31 lying in the cassette 30 or of the service card 31 lying on top of block 36.

When the cover is closed the cassette 30 is preferably also always closed, and this can be achieved for example if the cover 90 presses against the front 33 of the cassette 30 in closing, forcing the latter into the "closed" position. The cassette 30 is preferably provided with a stop bearing against the service face 2 so that the cassette 30 cannot be re-opened automatically when the cover 90 is opened.

The user can now open the cassette by loosening the stop and can remove the block 36 from the cassette 30. Since the program recognizes by means of the reading unit 41, through its interrupt-controlled periodic scanning for example, that no service card 31 is present in the cassette 30, the program displays an error message in display 3. This error message could be designed so that the decimal points of the four digits 10 in the uppermost line of display 3 are flashing, for example.

The user selects those service cards 31 from block 36 which give information on the desired data. Block 36 contains for example a service card 31 containing the following information:

| Line | Text | |
|------|------|---|
| 1 | Exterior temperature | °C. |
| 2 | Boiler temperature | °C. |
| 3 | Heating flow temperature | °C. |
| 4 | Heating backflow temperature | °C. |
| 5 | Temperature of warm water boiler | °C. |
| 6 | Actual temperature of testing room | °C. |
| 7 | Set-point temperature of testing room | °C. |
| 8 | Operating time (serviceable time; 0 = idle time) | |
| 9 | Burner (0 = OFF 1 = ON) | |
| 10 | Circulation pump heating (0 = OFF 1 = ON) | |
| 11 | Boiler loading pump (0 = ON 1 = OFF) | |
| 12 | Mixing valve heating | % opening |

Since the user finds the parameters for which he wants to know the data on this service card 31 he opens the block 36 in such manner that this service card 31 comes to lie on top and inserts it through the opening 32 into the cassette 30. The codes of the topmost service card 31 are read dynamically o statically by the reading unit 41. Information on which service card 31 is in the cassette is placed into an appropriate data storage location in the data memory 52.

It may be advantageous to design the program so that an identification number of the service card 31 which is also printed on the service card 31 appears in display 3 so that the user may be able to verify whether the service card 31 was recognized correctly.

By closing the cassette 30 a program part is called up which reads the identification number of the uppermost service card 31 in cassette 30 from the data memory 52 and then branches off to a program part which reads the data pertaining to this service card from the data memory 52 and displays them in display 3. In this manner the following display in label 4 and in displaY 3 can be for example presented to the user:

| Line | Text | Values in display 3 |
|---|---|---|
| 1 | Exterior temperature °C. | 5.3 |
| 2 | Boiler temperature °C. | 80 |
| 3 | Heating flow temperature °C. | 45 |
| 4 | Heating backflow temperature °C. | 39 |
| 5 | Temperature of warm water boiler °C. | 60 |
| 6 | Actual temperature of testing room °C. | 20.7 |
| 7 | Set-point temperature of testing room °C. | 20.5 |
| 8 | Operating time (serviceable time; 0 = idle time) | 2 |
| 9 | Burner (0 = OFF 1 = ON) | 1 |
| 10 | Circulation pump heating (0 = OFF 1 = ON) | 0 |
| 11 | Boiler loading pump (0 = ON 1 = OFF) | 1 |
| 12 | Mixing valve heating | 30% opening |

The user is thus presented with up-to-date data representing a description of the operating state of the heating installation. By referring to the information contained in label 4 the user can interpret the data displayed in display 3 correctly, without requiring the explanations of service manual. The data displayed in display 3 are values which the user cannot change through correction. For this reason the program is designed so that the program part which displays the data as shown above ignores actuation of the selection keys 5 and of the edit key 6. Neither does the actuation of a selection key 5 cause the value in the corresponding display line 7 to flash.

In the example shown above the states of certain installation elements are designated by the figure "0" for the "OFF" state and by the figure "1" for the "ON" state. However, it is also possible to use the marking field 11 for this purpose instead of the digits 10. In that case the visible marking field 11 would signify for example that the "ON" state exists while the "OFF" state is characterized in that the marking field 11 is not visible.

In a number of conventional regulating devices switches with more than two positions are also provided. They are used as program selection switches for instance, to select one among several alternative operating modes. In a regulating device for a heating installation such a program selection switch can for example have the following four positions: Installation Off, Installation on Manual Operation, Installation on Automatic Operation (reduced at night), Installation on Savings Operation (constantly reduced). The last-mentioned operating alternative can be used to heat at reduced levels While away on vacation, for example.

It is also advantageous to simulate such a program selection switch by means of the label 4 and the display lines 7. This is accomplished for example in that several lines of the label 4 and several display lines 7 are combined into a unit which can be recognized as such as indicated below:

| Line | Text | | Display 3 |
|---|---|---|---|
| 1 | Pro- | Heating off | |
| 2 | gram | Heating on, manual | |
| 3 | switch | Heating on, automatic | # |
| 4 | | Heating on, vacation mode | |
| . | ... | | |

In this case the symbol "#" indicates that the corresponding marking field 11 is visible. It is now clearly apparent to the user that with such a display the heating is switched on and is running on automatic operation and also that he must depress the selection key 5 attributed to the fourth line of the label 4 if he wishes to switch the installation to vacation mode. If the user depresses this fourth key, the program branches off to a program part which causes the marking field 11 visible in the third line to disappear while the marking field 11 of the fourth line becomes visible.

If the user wishes to modify changeable data, the change to be effected can be more or less extensive. In changing the day of the week which can only accept values from 1 to 7, a short range of values is available. If each depression of the edit key 6 changes the value by the amount one, the entire range of values can be reached with a maximum of six separate depressions.

It is advantageous to make it possible to change values not only by separate key actuations when data with a wider range of values are involved, but also in that prolonged depression of the edit key 6 results in repetitive change of the value for as long as said edit key 6 is being depressed. This is achieved in that the scanning of the state of the edit key 6 undertaken by the microprocessor 50 occurs at such brief intervals that the program running in said microprocessor 50 is able to distinguish between a brief individual actuation and the continued depression of the edit key 6 for a longer period. If the microprocessor 50 recognizes that the edit key 6 is being depressed for a longer period, a program part is called up by means of which a continuous correction of the value is effected for as long as the edit key 6 remains depressed. It may be appropriate in this case not to maintain the speed of the continuous correction constant but to accelerate it as the edit key is being depressed for an increasing period of time. It may also be advantageous for the speed of the correction to be a function of the momentary value, e.g. that the speed of change increases as the value increases and in that the speed of change decreases as the value decreases. In this way the user is able to effect greater value changes in a brief period of time.

Finally, the above-described embodiments of the invention are intended to be illustrative only. Numerous alternative embodiments may be devised without departing from the spirit and scope of the following claims.

I claim:

1. A programmable regulating device for use in connection with a heating, ventilation, or air conditioning installation comprising:
   a microprocessor,
   a program and data memory, and
   a service panel,
   said service panel comprising:
   a display having a plurality of display lines,
   a label,
   a plurality of selection keys, a selection key and a portion of said label being associated with each display line,
   an edit key for changing the contents of said display lines,
   a plurality of service cards for varying the contents of said label, each of said service cards including label portions corresponding to said display lines and a machine readable encoding field comprising at least one marking for differentiating between service cards, and
   a reading unit for reading said markings on said service cards so that said microprocessor receives information by means of said reading unit as to a particular service card assigned to said service panel,
   wherein said microprocessor services a particular portion of a program depending on the information as to the particular assigned service card received in said reading unit so as to display information on said display lines corresponding to the label portions of the particular service card.

2. The regulating device as in claim 1, characterized in that a cassette into which said service cards can be introduced is installed on the service panel.

3. The regulating device as in claim 2, characterized in that the reading unit is located in the cassette.

4. The regulating device as in claim 2 or 3, characterized in that the markings are optically readable and in that the reading unit contains at least one read element comprising a light-emitting diode and a photo transistor.

5. The regulating device as in one of the claims 2 or 3, characterized in that a cassette contact which can be actuated by the cassette is checked periodically by the microprocessor with respect to its state, whereby the microprocessor ascertains whether the cassette is in an open position permitting the changing of the service cards or in a closed position which does not permit the changing of service cards, and when the cassette is in the closed position, the microprocessor services a program part by means of which data corresponding to a particular service card are displayed in the display.

6. The regulating device as in claim 5, characterized in that when the cassette assumes the open position, the microprocessor services a program part by means of which information is displayed in the display showing which service card has been recognized by the reading unit.

7. The regulating device as in one of the claims 2 or 3, characterized in that a cover is located on the service panel, said cover preventing access to the cassette when in a closed position, while a user has access to the cassette when the cover is in an "open" position.

8. The regulating device as in claim 7, characterized in that a cover contact capable of being activated by the cover is provided and is periodically checked by the microprocessor to ascertain its state, enabling the microprocessor to ascertain whether the cover is in the closed or in the open position, whereby information pertaining to the service card in the cassette is displayed in the display only when the cover is open.

9. The regulating device as in claim 7, characterized in that the cover can be locked.

10. The regulating device as in claim 8, characterized in that the cover is provided with a cover face on which a label is installed and in that when the cover is closed, the microprocessor carries out a program part which displays in said display information pertaining to the label on the cover face.

11. The regulating device as in claim 1 or 2 characterized in that the actuation of said selection key causes the microprocessor to service a program part which in turn causes the information pertaining to the display line associated with the actuated selection key to be displayed in a flashing form when the program part permits the information to be changed by the user.

12. The regulating device as in claim 11, characterized in that the edit key becomes active when the information is displayed in a flashing mode, allowing the user to decrease or increase the value of the information.

* * * * *